(12) United States Patent
Maguire

(10) Patent No.: US 9,868,228 B2
(45) Date of Patent: Jan. 16, 2018

(54) MOLDING APPARATUS AND METHOD WITH HEAT RECOVERY

(71) Applicant: Stephen B. Maguire, West Chester, PA (US)

(72) Inventor: Stephen B. Maguire, West Chester, PA (US)

(*) Notice: Subject to any disclaimer, the term of this patent is extended or adjusted under 35 U.S.C. 154(b) by 532 days.

(21) Appl. No.: 14/164,663

(22) Filed: Jan. 27, 2014

(65) Prior Publication Data

US 2014/0138055 A1    May 22, 2014

Related U.S. Application Data

(63) Continuation of application No. 12/350,455, filed on Jan. 8, 2009, now abandoned.

(51) Int. Cl.
| | |
|---|---|
| B29B 13/02 | (2006.01) |
| B29C 33/04 | (2006.01) |
| F28D 7/10 | (2006.01) |
| B29C 43/52 | (2006.01) |
| B29C 45/72 | (2006.01) |
| B29C 49/48 | (2006.01) |
| B29C 51/42 | (2006.01) |

(52) U.S. Cl.
CPC ............ *B29B 13/02* (2013.01); *B29B 13/021* (2013.01); *B29C 33/04* (2013.01); *B29C 43/52* (2013.01); *B29C 45/72* (2013.01); *B29C 49/4823* (2013.01); *B29C 51/42* (2013.01); *F28D 7/106* (2013.01); *Y02P 70/26* (2015.11)

(58) Field of Classification Search
USPC .......................................... 264/238; 425/547
See application file for complete search history.

(56) References Cited

U.S. PATENT DOCUMENTS

| | | | |
|---|---|---|---|
| 3,748,866 A * | 7/1973 | Heider et al. ..................... 62/99 |
| 4,313,751 A | 2/1982 | Torok | |
| 4,573,897 A * | 3/1986 | Piazzola ....................... 425/143 |
| 4,657,574 A | 4/1987 | Foster | |
| 5,398,745 A | 3/1995 | Cook | |
| 5,824,237 A * | 10/1998 | Stumpf et al. .................. 249/80 |
| 6,755,640 B2 * | 6/2004 | Bauer et al. ................... 425/551 |
| 7,303,387 B2 | 12/2007 | Hutchinson et al. | |
| 2009/0142439 A1 * | 6/2009 | Cooke ........................... 425/548 |

* cited by examiner

*Primary Examiner* — Jacob Thomas Minskey
(74) *Attorney, Agent, or Firm* — Fox Rothschild LLP

(57) ABSTRACT

Apparatus and method for recapturing and reusing heat provided in the course of fabricating a molded product.

3 Claims, 7 Drawing Sheets

MOLDING APPARATUS AND METHOD WITH HEAT RECOVERY

FIELD OF THE INVENTION

This invention relates to apparatus and methods for recovering heat from a molded product and/or the machine in which the product is molded and applying the recovered heat to resin prior to molding. More specifically, this invention conserves energy by recirculating heat captured from the molded product and/or the molding machine to pre-heat the raw resin molding material, before the raw resin material enters an extruder or a molding apparatus.

BACKGROUND OF THE INVENTION

Molded products, such as plastics, and the like, have been known for decades and are used, inter alia, for product packaging, product presentation, material storage, and the like. Because of their widely-varying nature and characteristics, energy efficient methods of producing these items are a necessity. Of particular interest are methods to quickly cool a molded product, particularly within the context of manufacturing facilities.

Previous methods of cooling, while effective in cooling a product of interest, are wasteful in failing to recapture heat lost during processing. Rather than being reused, the heat was entirely lost, thus increasing energy costs by requiring more heat in earlier processing steps. Known systems and methods are largely inefficient, thereby increasing operating costs of molding and manufacturing molded products.

Early cooling methods included the application of either ambient air from a fan or compressed air blown across the molded product immediately after molding. These convective cooling methods removed heat from the molded product. The removed heat, however, was not contained within a closed system, but was wastefully lost. Thus, while the molding method achieved its objective, it was largely inefficient, as additional energy was required to create the required heat in earlier processing steps.

U.S. Pat. No. 4,657,574 discloses cooling molded glass using a rod-shaped material of higher thermal conductivity than the mold. Specifically, the rod-shaped material extends through the mold in a position proximate to the heated product, where the rod is able to extract heat from the heated product and then withdraw into a recess. This apparatus and method are largely inefficient because the heat extracted from the resulting product is not reused within the system but is lost.

U.S. Pat. Nos. 4,313,751; 5,398,745; 5,824,237; and 7,303,387 disclose alternative methods of cooling a molded product using convective fluid flow. Specifically, each of these patents discloses a molding machine with one or more channels passing through the mold, proximate to the heated product. A cooling medium, e.g. water, may be passed through these channels and, ultimately, through the mold itself. As it passes through the mold, the cooling medium extracts heat from the molded product that is in the mold using convective cooling mechanisms. While these approaches appropriately cool the heated product, they do not use the extracted heat in any way. Rather, the heat is largely lost, providing inefficiency within the system.

U.S. Pat. No. 3,748,866 discloses an alternative wherein a heated product is cooled using a larger refrigeration system. A first loop of circulated cooling fluid passes through channels of the mold and through a heat exchanger. As the fluid of the first loop passes through the mold, the fluid receives heat, thereby cooling the molded product. The heated fluid then passes into a heat exchanger in which fluid from a second coolant loop extracts the heat from the first loop. The fluid from the first loop is then recirculated back through the mold and the fluid from the second loop is provided to a compressor and an associated condenser, where it is cooled and recirculated to the heat exchanger. While this system uses multiple processing steps to provide a circulation system for lowering the temperature of the mold, there is no reapplication of the captured heat back to the molding process. Thus, this system does not maximize efficiency of a molding method.

Based on the foregoing, apparatus and methods for cooling a molded product with little to no loss of the recaptured heat are desirable. Apparatus and methods are further desirable that recapture heat from the molded product and apply that heat to one or more earlier steps in the molding process. Finally, apparatus and methods are desirable for extracting heat from the molded product and reapplying that heat to un-molded resin such that the resin is heated prior to being molded.

This invention addresses these needs.

SUMMARY OF THE INVENTION

This invention relates to molding apparatus and methods for recapturing and reusing heat from a molded product. More specifically, this invention provides apparatus and methods for recapturing heat from a molded product and circulating the heat to raw material, namely resin, to facilitate heating the raw material, to at least warm it prior to molding. Accordingly, this invention provides apparatus and methods for conserving energy in molding processes, making these processes more energy and cost efficient.

In one of its manifestations, the apparatus and methods of this invention include a molding press, a heat exchanger, a raw material container, and one or more fluid channels providing thermal connection among these elements. The fluid channels may be in the form of a continuous loop between the molding press and the heat exchanger where heat from the molded product in the molding press is transferred to the heat exchanger by first fluid flow within these channels. The fluid channels establish a convective flow between the molding press and the heat exchanger such that heat from a molded product and the proximate portion of the molding press is transferred from the molding press to the heat exchanger.

Heat directed into the heat exchanger is then preferably transferred to a second fluid medium such that the first fluid is cooled and the second fluid is heated. The cooled first fluid is then preferably recirculated back to the molding press and the heated second fluid is preferably redirected into a container housing raw material to be molded, preferably plastic resin. Within this container, heat from the second fluid is absorbed by the materials to be molded, thereby heating the materials to be molded and cooling the second fluid, which is then evacuated from the container into either the surrounding environment or back into the heat exchanger. To this end, the apparatus and methods of this invention provide a circulation system adapted to extract heat from the molded product produced by the molding press and to apply this heat to raw material that is awaiting molding in the container.

In a preferred embodiment, the first fluid is water, which is circulated through the molding press and heat exchanger via one or more channels. In the molding press, the water absorbs heat from the molded product and the surrounding part of the molding press, resulting in an increase in the temperature of the water and cooling of the molded product. The heated water then flows into the heat exchanger.

In the heat exchanger, ambient air is preferably directed along and/or across the fluid channels housing the water, thereby extracting heat from the water. As the heat is extracted, the water is cooled and air flow is proportionately increased, resulting in a transfer of heat from one medium to the other. The heated air is then redirected into and through a container housing raw resin that is ready to be molded. As the air passes through the container, heat from the air is absorbed by the resin, thereby heating the resin and cooling the air. The cooled air is then evacuated from the container and, optionally, recirculated back to the heat exchanger.

In effect, this invention recovers heat coming from a molded product within the molding press and reuses this heat in an earlier process step. This is advantageous because it provides cost and energy efficiency to the overall molding process.

DESCRIPTION OF THE DRAWINGS

FIG. 3A depicts a parallel-flow shell-tube type heat exchanger; FIG. 3B depicts a counterflow shell-tube type heat exchanger; and FIG. 3C depicts a cross-flow shell-tube type heat exchanger.

DETAILED DESCRIPTION OF THE INVENTION

This invention relates to a molding apparatus, especially molding presses, and methods facilitating recapture and reuse of heat produced in the course of molding a product. More specifically, this invention provides apparatus and methods for recapturing heat produced in the course of fabricating a molded product and circulating the recaptured heat to raw material awaiting molding, to heat these materials prior to molding them, thereby reducing the amount of heat required during the actual molding process. Accordingly, this invention provides apparatus and methods for conserving energy in molding processes, thereby making the processes more energy and cost efficient.

Figure 1:
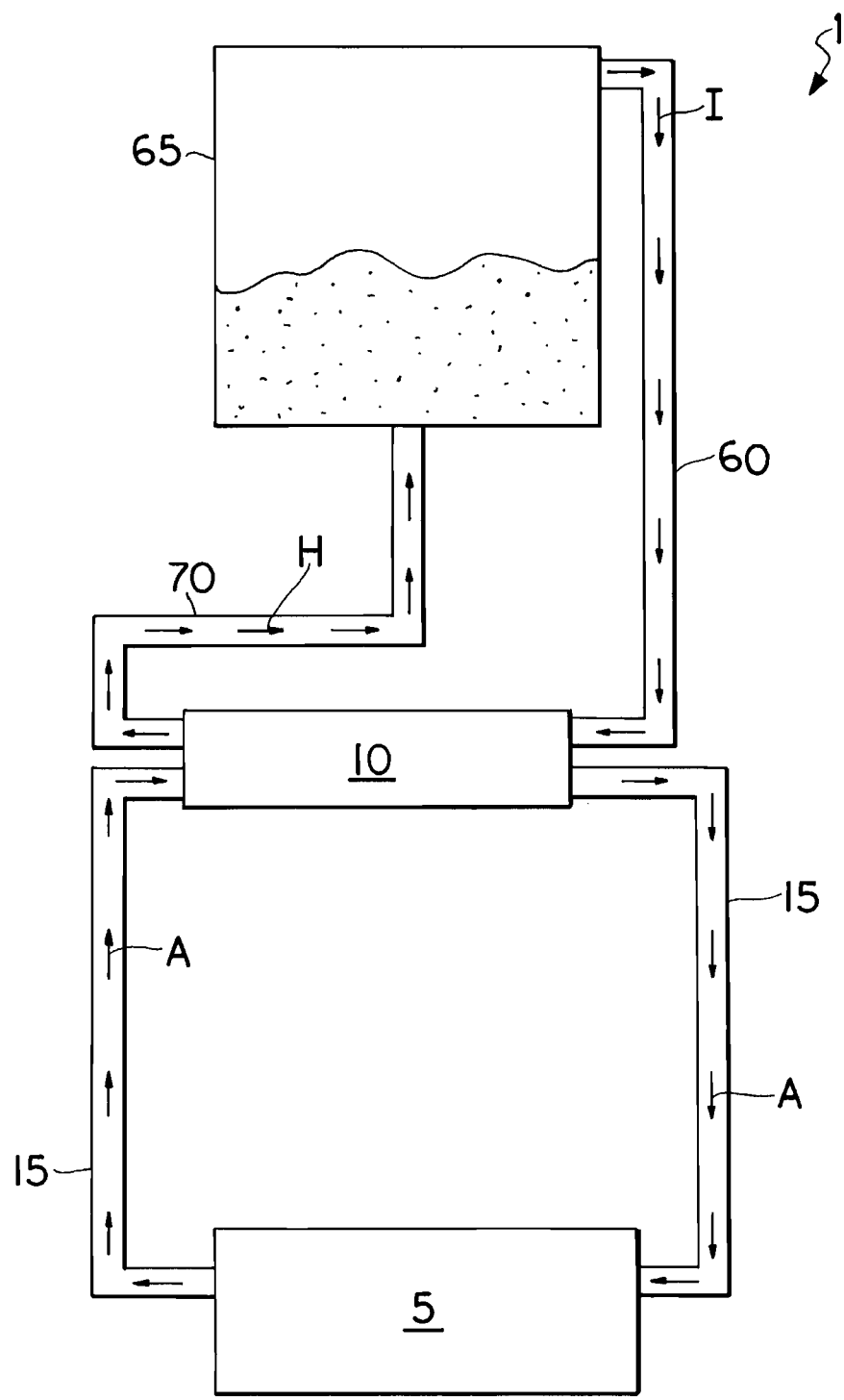
FIG. 1 is a schematic front elevation of apparatus manifesting aspects of the invention, illustrating in schematic form a generic molding apparatus, a generic heat exchanger, and a raw material container, with fluid flow provided therebetween.

Referring to FIG. 1, a schematic, generic representation of apparatus manifesting aspects of the invention is generally indicated by reference number 1. In this embodiment of the invention, the apparatus includes, at least, a molding apparatus, desirably a molding press, illustrated schematically as 5, a heat exchanger 10, a raw material container 65, and channels 15, 60, 70 for fluid flow. A first set of one or more channels 15 provides a continuous loop between molding apparatus 5 and heat exchanger 10 wherein heat from a molded product produced within molding apparatus 5 is carried to heat exchanger 10 by fluid within channels 15. To this end, channels 15 pass through molding apparatus 5 where a first fluid within channels 15 absorbs heat from the molded product within apparatus 5 and from parts of apparatus 5 that are proximate to the molded product. This heated fluid then travels from molding apparatus 5 in the direction of arrows A towards and into heat exchanger 10.

Within heat exchanger 10, heat stored within the first fluid is transferred to a second fluid such that the first fluid is cooled and the second fluid is heated. While the cooled first fluid is recirculated back to molding apparatus 5, the heated second fluid is then directed along channel 70 towards and into raw material container 65. As the second fluid passes through container 65, heat from the second fluid is absorbed by the raw material in container 65 resulting in overall heating of the raw materials prior to processing. The second fluid is cooled as it passes through container 65 and gives up its heat to the raw material within container 65. The second fluid may be either evacuated to the surrounding environment or recirculated back towards heat exchanger 10 by channel 60. To this end, in the schematically illustrated embodiment, the apparatus and method provide a dual circulation system for extracting heat from the molded product produced by molding apparatus 5 and applying this heat to raw material within container 65.

Figure 2:
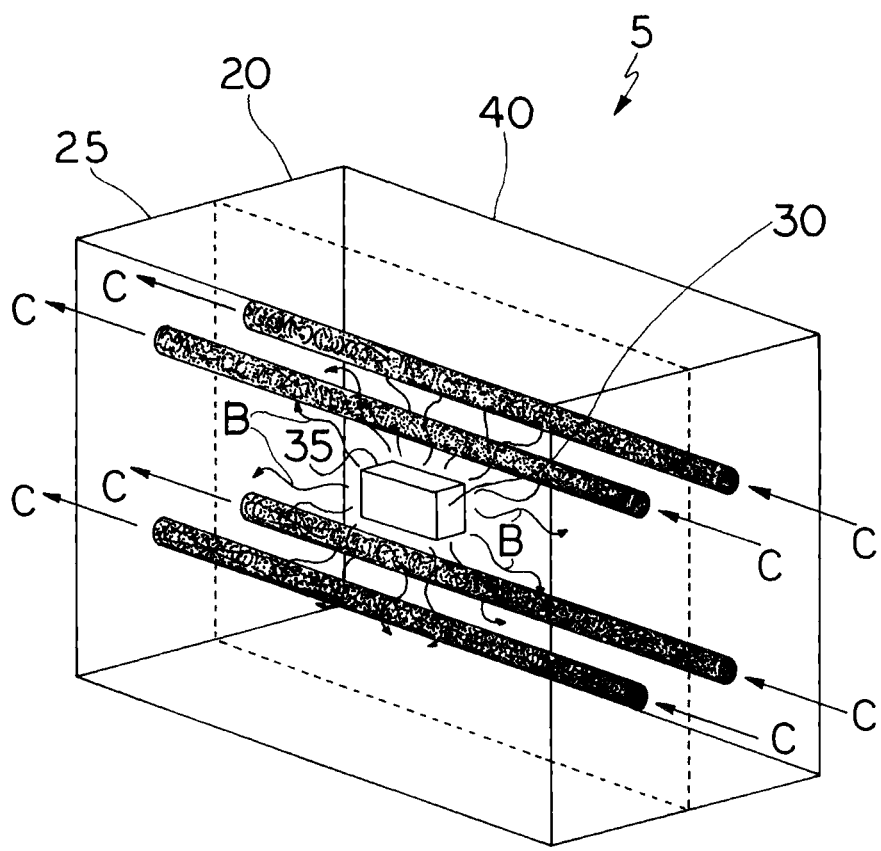
FIG. 2 is a schematic isometric view of the FIG. 1 molding apparatus, having a plurality of fluid flow channels passing therethrough.

Referring to FIG. 2, a schematic representation of a molding apparatus 5 is illustrated. Molding apparatus 5 is illustrated as including two halves 20, 25, each having an interior surface 35 and an exterior surface 40. Most preferably, the interior surfaces 35 of each half 20, 25 are aligned such that, when connected, the two halves 20, 25 define one or more hollow chambers 30, typically referred to as "mold cavities", therebetween. The hollow chamber(s) 30 are configured to form a molded product, which may be of any desirable shape or configuration, e.g. preforms, containers, or any other articles that are formed by compression, injection or blow molding. The hollow chamber(s) 30, and molding apparatus 5, may be adapted to receive any type of material that is known in the art for molding. Such materials may include, but are not limited to, glass, metals, plastics, ceramics, and the like. The preferred material is resin used to mold plastic products.

The molding halves, which define the mold, may be made of any material known in the art for use in a molding apparatus. For example, the mold may be a steel alloy or cast iron halves that are held together using any suitable means. Accordingly, the size, shape, composition, etc. of the molding apparatus is not limiting as respecting this invention. Rather, molding apparatus 5 as illustrated schematically may be any form or type of molding apparatus that is known in the art such as, but not limited to, stretch blow-molding apparatus, injection molding apparatus, compression molding apparatus, thermomolding or thermoforming apparatus, vacuum forming apparatus, transfer molding apparatus, extrusion apparatus, rotational molding apparatus, and the like. The molding apparatus 5 may include additional elements known in the art as being useful for molding such as, but not limited to, non-stick surfaces, specialty heat dissipating surfaces, and the like.

In any of the forgoing forms and embodiments, molding apparatus 5 includes one or more fluid channel portions designed C where "C" denotes the fluid flow throughout portions of channels 15 that are within molding apparatus 5, facilitating cooling fluid flow through or around molding apparatus 5 in positions adjacent to hollow cavity 30 so as to be thermally coupled thereto. As illustrated in FIG. 2, the channels 15 may pass from one side of the exterior surface of a mold half, through the interior of the mold, and out an opposite side of the exterior surface of a mold half. Most preferably, the channels 15 pass through or about the mold halves such that fluid within the channels receives heat that is conducted, convected and/or radiated from the molded product, with such heat flow being represented by arrows B of FIG. 2. Heat flow through the unmarked structure that thermally couples hollow mold cavity 30 to portion C of channel 15 is denoted by letter "B" in FIG. 2.

While FIG. 2 illustrates four such channels passing through the mold, the invention is not so limited. Rather, this invention may include more or fewer channels, based on the desired and effective rates of cooling the molded product. While channels 15 are illustrated in FIG. 2 as passing directly through molding apparatus 5, this invention is not limited to this configuration. Rather, the channel(s) may be rounded or adapted to substantially encircle the molded product one or multiple times so as to increase the surface area exposed to recover heat from the molded product.

Channels 15 provide primarily convective cooling for lowering the temperature of the molded product. To facilitate this objective, channels 15 may be formed from any suitable thermally conductive material, typically a high melting point metal. The thermally conductive channels 15 may be the same material as molding apparatus 5 and/or may be integrally formed therein and extend therefrom. Accordingly, channels 15 may be comprised of bores machined through molding apparatus 5 that are coupled to and in fluid communication with external portions of the channels passing between molding apparatus 5 and heat exchanger 10, as shown in FIG. 1. In such an arrangement, it may also be desirable that channels 15 be comprised of a thermally conductive surface within the molding apparatus, but be insulated at the exterior portions extending between molding apparatus 5 and heat exchanger 10. In such an embodiment, heat extracted into the channels 15 within the molding apparatus is not lost when traveling along channel 15 to heat exchanger 10. Such insulation may be provided by a means exterior to these portions of the channel 15, e.g. an insulative jacket, or by a variation in the composition of channel 15 at these positions, to provide such insulative properties.

Alternatively, the thermally conductive material of channels 15 may be comprised of a different, preferably more conductive, material than molding apparatus 5. In this approach, channels 15 may be configured as a continuous loop, where the channels pass through bores machined into molding apparatus 5. Most preferably, bore diameter is essentially the same as the exterior diameter of the channel such that the channels may be easily coupled to the molding apparatus. Again, the portions of the channel 15 not contained within molding apparatus 5 or heat exchanger 10 should be insulated such that heat is not lost as the fluid travels therebetween.

Figure 4A:
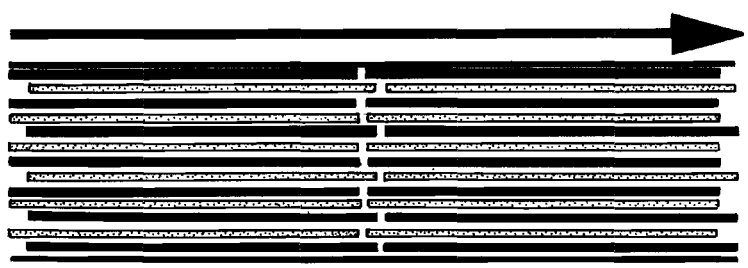
FIG. 4A is a schematic depiction of laminar fluid flow.
Figure 4B:
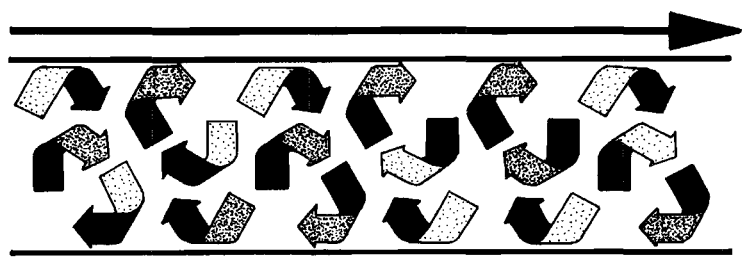
FIG. 4B is a schematic depiction of turbulent fluid flow.

A cooling medium is conveyed through channels 15 to facilitate convective extraction of heat from the molded product. This cooling medium may be any suitable thermally conductive fluid. Such cooling fluids may include, but are not limited to, water, air, oil, refrigerant, and the like. Most preferably, the cooling medium is water. As illustrated by arrows C in FIG. 2, flow of the thermally conductive fluid may provide a current of fluid passing very close to the hollow cavity(s) 30. The fluid flow may be laminar, as depicted in FIG. 4A, wherein fluid glides through the channel in smooth layers with the innermost layer typically flowing at a higher rate than the outermost layer. More preferably, however, the fluid flow is turbulent, as depicted in FIG. 4B, wherein the flow is agitated rather than smooth. Turbulent flow is preferred because laminar flow tends to develop an insulating blanket around the channel wall, thus reducing heat transfer. Turbulent flow, however, being agitated, thereby prevents any such insulating blanket and allows a greater surface area of the fluid to conduct heat. To this end, the cooling medium turbulently flows through the molding apparatus 5 extracting heat from the molded product within the hollow cavity(s) 30. This results in an increase in the temperature of the cooling medium as it passes through the molding apparatus 5 and a decrease in the temperature of the molded product within the hollow cavity (s) 30.

Fluid within channels 15 may be provided by a storage tank (not illustrated) or some alternative source that is connected to the circulation loop formed by channels 15. To this end channels 15 may be in communication with the tank or the other source by a separate channel (not illustrated) wherein the separate channel may be selectively opened or closed so as to control or replenish the fluid supply within channels 15.

Circulation of fluid within channels 15 may be controlled by a pump (not illustrated) or other similar means. Most preferably a pump is positioned between heat exchanger 10 and molding apparatus 5 such that the fluid exiting heat exchanger is pumped back into molding apparatus 5, as illustrated by arrow A in FIG. 1. The pump may be a conventional or commercially available centrifugal pump, or the like.

The foregoing embodiment of molding apparatus 5 and channels 15 is not intended to be limiting. Rather, molding apparatus 5, to include channels 15, may be adapted from molding apparatus previously known. For example, the molding apparatus of this invention may be comprised of any of the embodiments disclosed in U.S. Pat. Nos. 3,748, 866; 4,657,574; 5,398,745; 5,824,237; and 7,303,387, the disclosures of which are incorporated by reference herein. Each of these patents provides a known molding apparatus with one or more channels passing therethrough or thereabout. Accordingly, the molding apparatus and channels of this invention may be adapted as provided in these patents, or any other similar type of molding apparatus that is known in the art and is in accordance with the teachings of this invention.

Figure 3A:
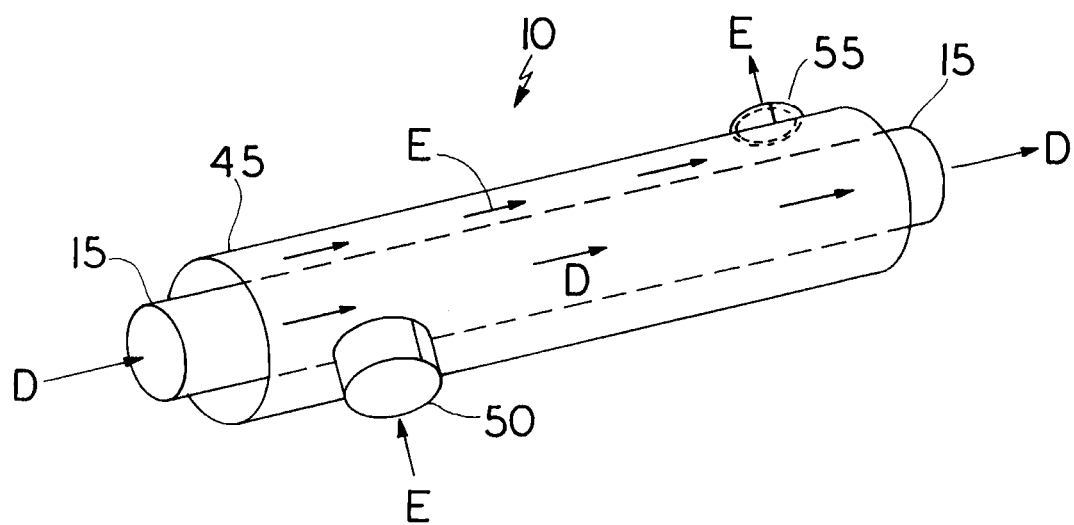
FIGS. 3A through 3C are schematic isometric views of the generic shell-tube type heat exchanger depicted in FIG. 1, having a first fluid flow channel passing therethrough and a flow path for a second fluid across the first fluid flow channel.
Figure 3B:
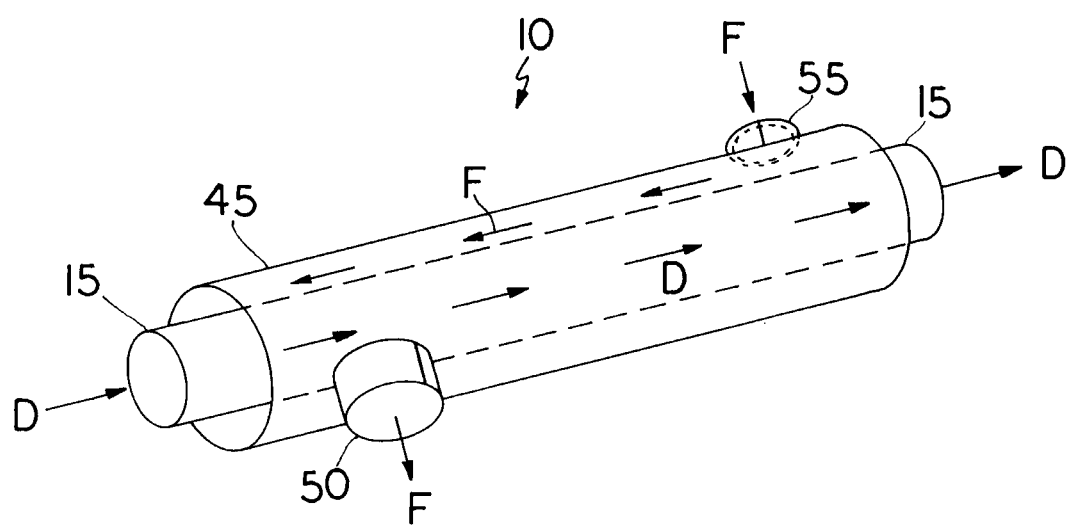
Figure 3C:
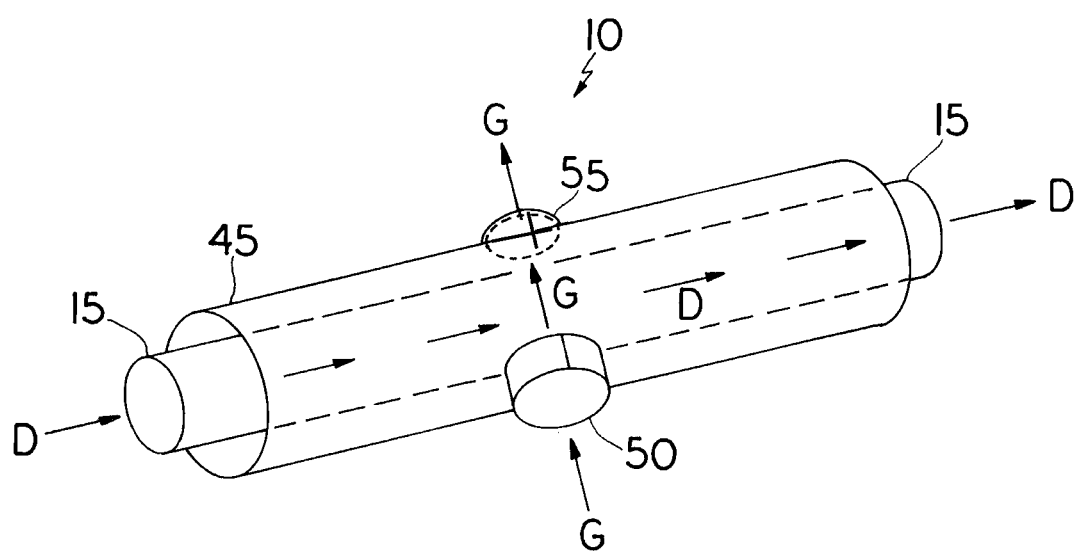

Turning to FIGS. 3A through 3C, one embodiment of heat exchanger 10 is illustrated wherein the heat exchanger is adapted to extract heat from channels 15. As illustrated, heat exchanger 10 may be comprised of a conventional shell-tube heat exchanger having an insulative shell 45 encasing one or more channels 15. To this end, the apparatus may include one heat exchanger 10 encasing all of channels 15. Alternatively, there may be multiple heat exchangers in fluid communication, where each heat exchanger individually encases a single channel 15.

The heat exchanger 10 preferably utilizes convective methods to extract heat from fluid within channels 15. Most preferably, heat exchanger 10 provides a second thermally conductive fluid, typically air, flowing across the exterior surface of channel 15. The convective current established by the air flow, which is preferably at ambient temperature, extracts the heat from the channels, thereby heating the fluid in the heat exchanger 10 and cooling the fluid within channels 15. The fluid flow within heat exchanger 10 may be either laminar or turbulent, with turbulent being preferred for the reasons discussed above. Accordingly, the heat exchanger may also include one or more fins or corrugations in one or both directions, which increase surface area and may channel fluid flow or induce turbulence.

The shell-tube heat exchanger may be a parallel-flow heat exchanger, a counterflow heat exchanger or a cross-flow heat exchanger. Referring to FIG. 3A, the illustrated heat exchanger facilitates parallel-flow heat exchange wherein the fluid flow within the heat exchanger as indicated by arrow E, is parallel to the fluid flow in the channels as indicated by arrow D. More specifically, shell 45 includes two orifices 50, 55 on opposing sides and opposing ends of shell 45. Air flows through the first orifice 50, through the interior of shell 45 and out of second orifice 55. The fluids in the shell 45 and in the channels 15, while not actually mixing, are in concert with each other. To this end, as fluid in heat exchanger 10 travels along the interior of channels 15, heat from the fluid in channels 15 is extracted. Ultimately, this increases the temperature of the fluid within heat exchanger 10 and decreases the temperature of the fluid within channels 15. Most preferably, fluid within channels 15 is reduced to ambient temperature and fluid within heat exchanger 10 increases a proportionate amount such that heat is efficiently transferred from one fluid to the other.

Referring to FIG. 3B, the schematically illustrated heat exchanger facilitates counter-flow heat exchange wherein fluid flow within the heat exchanger as indicated by arrow F, is opposite in direction to that of fluid flow within the channels, as indicated by arrow D. More specifically, shell 45 includes two orifices 50, 55 on opposing sides and opposing ends respectively of shell 45. Air flows through second orifice 55, through the interior of shell 45 and out of first orifice 50. The respective fluids within shell 45 and channels 15, while not actually mixing, flow in parallel paths that are directly opposite of one other. To this end, as fluid from heat exchanger 10 travels along the exterior sides of channels 15, heat from the fluid in the channels is extracted. This method is preferred as it provides the most efficient transfer of heat from the fluid within channels 15 to the fluid within the shell of heat exchanger 10. As with the previous embodiment, most preferably the temperature of the fluid within the channels is reduced to close to ambient temperature while the fluid within the heat exchanger shell increases a proportionate amount.

Referring to FIG. 3C, there is a schematically illustrated cross-flow heat exchanger wherein fluid flow within the shell of the heat exchanger, flowing in the direction indicated by arrow G, is substantially perpendicular to the direction of fluid flow within the channels, as indicated by arrow D. More specifically, shell 45 includes at least two orifices 50, 55 on opposing sides and may be located at any point along the length of shell 45. Air flows through first orifice 50, through the interior of shell 45 and out second orifice 55. The respective fluids in the shell 45 and in the channels 15, while not actually mixing, flow almost perpendicular to each other. To this end, as fluid from heat exchanger 10 travels along the exterior of channels 15, heat from the fluid in the channels is extracted. Ultimately, this increases the temperature of the fluid within the heat exchanger shell and decreases the temperature of the fluid flowing within the channels. Most preferably, the temperature of fluid flowing within the channels is reduced to close to ambient temperature and the temperature of the fluid flowing within the shell of the heat exchanger increases. While FIG. 3C illustrates two orifices 50, 50 aligned on opposing sides of the heat exchanger shell, this invention is not limited to this configuration. In an alternative embodiment, the shell 45 may include multiple orifices aligned with one another on opposing sides of the shell 45 and along the length of the shell such that the heat exchanger provides multiple points along the shell for cross-flow over channels 15. Such an embodiment would further maximize heat extraction within the heat exchanger.

This invention is not limited to the foregoing heat exchangers and may be adapted to include any similar type of heat exchanger known in the art. Non-limiting examples of other types of heat exchangers include, but are not limited to, plate heat exchangers, regenerative heat exchangers, adiabatic wheel heat exchangers, fluid heat exchangers, dynamic scraped surface heat exchangers, phase-change heat exchangers, multi-phase heat exchangers, spiral heat exchangers, and the like.

The fluid flow rate of the heat exchanger may be regulated by any means known in the art. For example, the fluid flowing through shell 45 of the heat exchanger may be provided by a pump which has not been illustrated. Most preferably, such a pump forces ambient fluid, e.g. air, into the targeted orifice of shell 45 such that a fluid flow path is established into and through the opposing orifice of shell 45. While air may be provided as one exemplary fluid, this invention is not limited to this configuration and any fluid known in the art as being suitable for use in a heat exchanger may be used.

Referring to FIG. 1, heat exchanger 10 is preferably placed into communication with a container 65 of raw material to heat the material prior to processing. More specifically, the heated fluid exiting heat exchanger 10, indicated by arrow H, is redirected through one or more insulated channels 70 into container 65. The heated fluid may be applied to the raw material using any method known in the art. More preferably, however, the heated fluid is applied to the raw material through one or more orifices on the underside of container 65. Most preferably, the heated fluid may be applied to the resin prior to molding at a position substantially underneath the container such that the resin to be molded is evenly heated by air, as the heated air rises within the container. Air flow from the heat exchanger forces the heated fluid into and through container 65. As the heated fluid passes through the container, the heat is absorbed by the raw resin material contained therein, thereby cooling the fluid. This cooled fluid is then evacuated from the container into the environment or used in accordance with methods discussed herein. The heat extracted from the molded product is desirably ultimately reapplied to heat more raw material prior to processing into a molded product.

In an even further embodiment, as illustrated in FIG. 1, cooled fluid evacuated from container 65 is recirculated back to heat exchanger 10. In this embodiment fluid flow between heat exchanger 10 and the raw material provides a second circulation loop for transfer of heat from heat exchanger 10 to container 65 and the material therein. This second circulation loop is optional. Rather, the evacuated air may be reintroduced to the surrounding environment with the pump attached to the heat exchanger resupplying ambient air in accordance with the foregoing.

The raw materials within container 65 may be resin or other particles used for the manufacture of plastic. To this end, the heated fluid from the heat exchanger 10 pre-heats the resin before the resin is processed. This invention, however, is not limited to this embodiment and may include any raw materials known in the art for manufacturing any molded product.

In an even further embodiment of this invention, a compressor or heat pump may, optionally, be added to the system at any point between the heat exchanger 10 and the raw material 65. The compressor or pump may be used to increase pressure of the heated second fluid such that it is able to flow completely through container 65 and increase effectiveness of the air flow. Most preferably, the compressor or heat pump may be placed between the heat exchanger 10 and the container 65 at any point along channel 70 such that the compressor or heat pump is in fluid communication therewith. The compressor may be any type of compressor known in the art such as, but not limited to, centrifugal compressors, mixed-flow compressors, axial-flow compressors, reciprocating compressors, rotary screw compressors, rotary vane compressors, scroll compressors, diaphragm compressors, or the like. Similarly, the heat pump may be any heat pump that is known in the art such as, but not limited to, compression heat pumps, absorption heat pumps, and the like.

Figure 5:
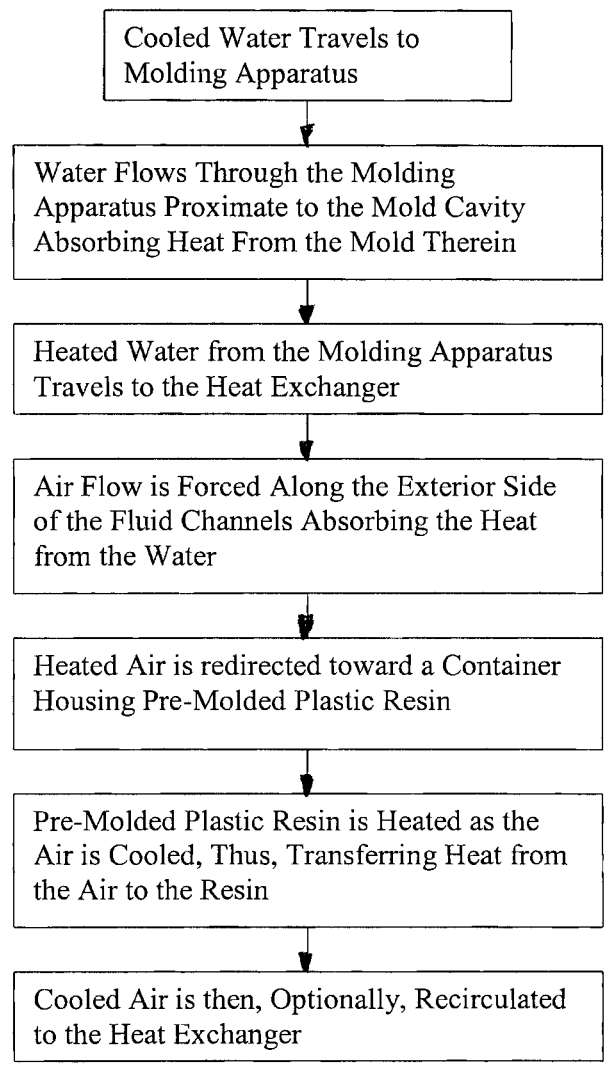
FIG. 5 is a flow chart depicting process aspects of the invention.

Referring to FIG. 5, a flow chart of process aspects of the invention is illustrated. As shown, water from the heat exchanger, or alternatively an external source, is provided and preferably pumped into the molding apparatus by way of one or more channels. As the water passes through the molding apparatus, it absorbs heat from the mold, thereby increasing its temperature and cooling the temperature of the molded product. The heated water then travels from the molding apparatus to the heat exchanger by way of one or more preferably insulated channels.

As the heated water travels into the heat exchanger, ambient air is directed along and ultimately across the channels. As the ambient air flows along the channels it extracts heat from water in the channels, thereby cooling the water and proportionately increasing the air such that minimal heat is lost. The heated air is then redirected, preferably pumped, into a container housing resin to be molded. As the heated air passes through the container, the heat is absorbed by the resin, thereby pre-heating the resin and cooling the air. Accordingly, the resin is heated prior to molding using heat recaptured from later processing steps. The cooled air may then, optionally, be recirculated back to the heat exchanger where it continues to absorb heat from the channels. This process continues until the molded product is completely cooled and/or the resin is pre-heated to a level sufficient for processing.

This invention is advantageous because it provides cost and energy efficiency to the overall molding processes. It is estimated that the foregoing apparatus and methods may save a molded product manufacturer approximately 1/10 to 1/5 a cent per pound of raw material, namely resin, processed. In a standard manufacturing facility, this may translate into a savings of at least $40,000 per year. Additional advantages of this invention will be readily apparent to one of ordinary skill in the art.

The following is claimed:

1. A method for pre-heating resin material prior to molding thereof comprising:
    a. providing a continuous cooling water circulation loop passing through a molding apparatus and a mold portion thereof, with the loop encircling a molded product within the mold, and passing through a water-air tubular heat exchanger, the cooling water circulation loop being independent of any fluid network for motivating the molding apparatus, the cooling water circulation loop being thermally connected to the molding apparatus and the mold;
    b. circulating water in a convective turbulent flow through the circulation loop such that heat captured by the water from the molding apparatus, the mold and any molded product in the mold is carried by the water to the heat exchanger;
    c. transferring heat captured by the water to air circulated within a second continuous cooling circulation loop, a portion of the second loop defining part of the heat exchanger, within the heat exchanger by flowing ambient air along channels carrying the water through the heat exchanger;
    d. redirecting the air from the heat exchanger into a container housing resin material to be molded in the mold of the molding apparatus thereby heating the resin material with the air after flowing along the channels, prior to molding the resin material in the mold portion of the molding apparatus.

2. A method for pre-heating plastic resin prior to molding thereof by capturing heat from a mold in which the resin is be molded independently of operation of apparatus performing the molding, comprising:
    a. providing a first cooling water circulation loop having a first portion passing through the apparatus and being in thermal connection with the mold and a second portion defining the tube of a shell-tube heat exchanger;
    b. providing a second cooling circulation loop for air circulation between the heat exchanger and a container housing resin to be molded in the molding apparatus the second circulation loop having a portion defining the shell of the shell-tube heat exchanger;
    c. circulating water through the first circulation loop such that heat captured from the mold by the water while passing through the molding apparatus is directed to the heat exchanger; and
    d. circulating air through the second circulation loop such that heat transferred from the water to the air within the heat exchanger is directed into the interior of a container housing the plastic resin, through an apertured bottom of the container supporting the resin for upward air flow therethrough.

3. A method for pre-heating resin material prior to molding thereof into a finished article, comprising:
    a. providing a closed cooling water circulation loop passing through a molding apparatus, a mold portion of the apparatus, encircling a molded article within the mold, and a heat exchanger, the closed cooling water circulation loop being thermally connected to the molding apparatus and the mold portion of the molding apparatus in which the resin is molded into finished articles;
    b. circulating water through the closed cooling water circulation loop such that heat captured by the water from the molding apparatus and the mold is carried to the heat exchanger;
    c. transferring heat captured by the water to air by flowing ambient air across a portion of the cooling water circulation loop within the heat exchanger;
    d. directing air having flowed across the portion of the cooling water circulation loop within the heat exchanger from the heat exchanger to a container housing resin material for molding in the molding apparatus by circulating the air through a second continuous cooling loop between the heat exchanger and the container such that the air that has been heated in the heat exchanger by having flowed across the cooling water circulation loop may be cooled in the container; and e. transferring heat of the air to the resin material to heat the resin material prior to processing in the molding apparatus by passing the air in the second loop through the container.

* * * * *